United States Patent

[11] 3,628,040

[72] Inventors Herbert W. Schnopper;
    Kenneth Kalata, both of Cambridge, Mass.
[21] Appl. No. 825,532
[22] Filed May 19, 1969
[45] Patented Dec. 14, 1971
[73] Assignee Massachusetts Institute of Technology
    Cambridge, Mass.

[54] HIGH-DISPERSION, HIGH-RESOLUTION X-RAY SPECTROMETER HAVING MEANS FOR DETECTING A TWO-DIMENSIONAL SPECTRAL PATTERN
14 Claims, 7 Drawing Figs.

[52] U.S. Cl. .................................................. 250/51.5
[51] Int. Cl. ............................................. G01n 23/22
[50] Field of Search ........................................ 250/49.5
    (8), 51.5

[56] References Cited
    UNITED STATES PATENTS
2,835,820  5/1958  Birks ............................ 250/51.5
3,102,196  8/1963  Ladell et al. ................... 250/51.5
3,321,624  5/1967  Kishino et al. ................. 250/51.5

OTHER REFERENCES
Williams et al.; Journal of Optical Society of America; Vol. 18; (1929); pp. 473– 478

*Primary Examiner*—Archie R. Borchelt
*Assistant Examiner*—A. L. Birch
*Attorneys*—Thomas Cooch, Martin M. Santa and Robert Shaw ABSTRACT: Apparatus is disclosed for providing a two-dimensional spectral pattern of X-ray radiation. The radiation, which may be provided by a wide angle point source in the apparatus or may come from a cosmic X-ray source, is directed upon a bent crystal to provide spectral dispersion and focusing The rays reflected from the crystal are then detected, as upon a film or the like, at an area positioned away from the focal region of the crystal to produce the two-dimensional pattern. In one embodiment of the apparatus provision is made to feed information from the detector to a computer to yield simultaneous analysis of the radiation both as to the frequencies present therein and the intensity of each.

Patented Dec. 14, 1971

INVENTORS:
HERBERT W. SCHNOPPER
KENNETH KALATA

BY *Robert Shaw*

ATTORNEY

INVENTORS:
HERBERT W. SCHNOPPER
KENNETH KALATA
BY Robert Shaw
ATTORNEY 3,628,040

HIGH-DISPERSION, HIGH-RESOLUTION X-RAY SPECTROMETER HAVING MEANS FOR DETECTING A TWO-DIMENSIONAL SPECTRAL PATTERN

The invention described herein was made in the performance of work under a NASA contract and is subject to the provisions of Section 305 of the National Aeronautics and Space Act of 1958, Public Law 85–568(72 Stat. 435; 42 U.S.C. 2,457).

The present invention relates to spectrometers and, particularly, to bent crystal focusing spectrometers for analyzing X-ray radiation and the like.

There exists a need for spectrometers adapted to give high resolution for spectral studies of X-rays both in connection with cosmic work as, for example, in connection with satellite X-ray astronomy and in strictly laboratory work where analysis of an X-ray source of radiation is made. For such purposes Johann or bent crystal spectrometers have been used. The practice has heretofore been to detect focused radiation at the focal region of the crystal. However, at the focal region the one-to-one correspondence between a point in the image plane and a point on the crystal is destroyed by the astigmatic effects of the cylindrical lens with the result that several different wavelengths can contribute to the image at one point on the detector. Also, high resolution studies are made difficult or impossible by the low dispersion at the focus.

It has been found for present purposes that by using a fairly large crystal 1 to 3 inches in cross dimensions) and detecting reflected rays at an area removed from the focal region of the crystal, a two-dimensional spectrally dispersed pattern results, thereby providing discrete spectral features of the X-ray radiation directed upon the crystal. What had been considered to be regions wherein distortions of the reflected rays would make such reflections of little use for spectral analysis were investigated and found to produce high resolution spectra. Thus, a two-dimensional pattern, taken in a region which heretofore was considered inappropriate for such investigations, was found to provide sharp spectral features.

Accordingly, an object of the present invention is to provide bent crystal spectrometer apparatus in which the reflected radiation is detected with a marked increase in spectral resolution (the order of a 10-fold increase or better) over conventional instruments.

Another object is to provide a spectrometer capable of analyzing X-rays from a wide-angle point source of radiation.

Still another object is to provide a spectrometer and computer combination wherein high resolution spectra of low intensity X-ray features may be obtained in short periods of time (on the order of 1 percent of the time presently required).

Other objects are evident in the discussion to follow and are particularly delineated in the appended claims.

The objects of the invention are attained in spectrometer apparatus adapted to display discrete spectral features of X-rays from a wide-angle source, which includes a curved crystal to receive the incident rays and a detector positioned away from the focal region of the crystal to display the rays as a two-dimensional spectral pattern from which a high-resolution spectrum may be obtained.

The invention will now be explained with reference to the accompanying drawing in which.

Figure 6:
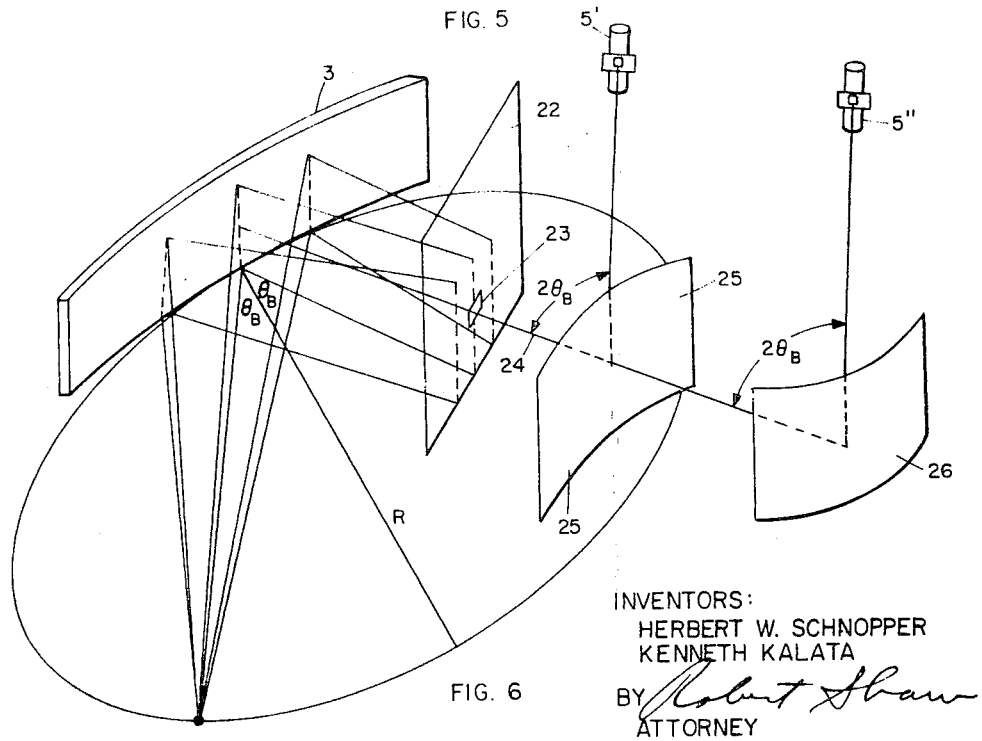
Figure 7:
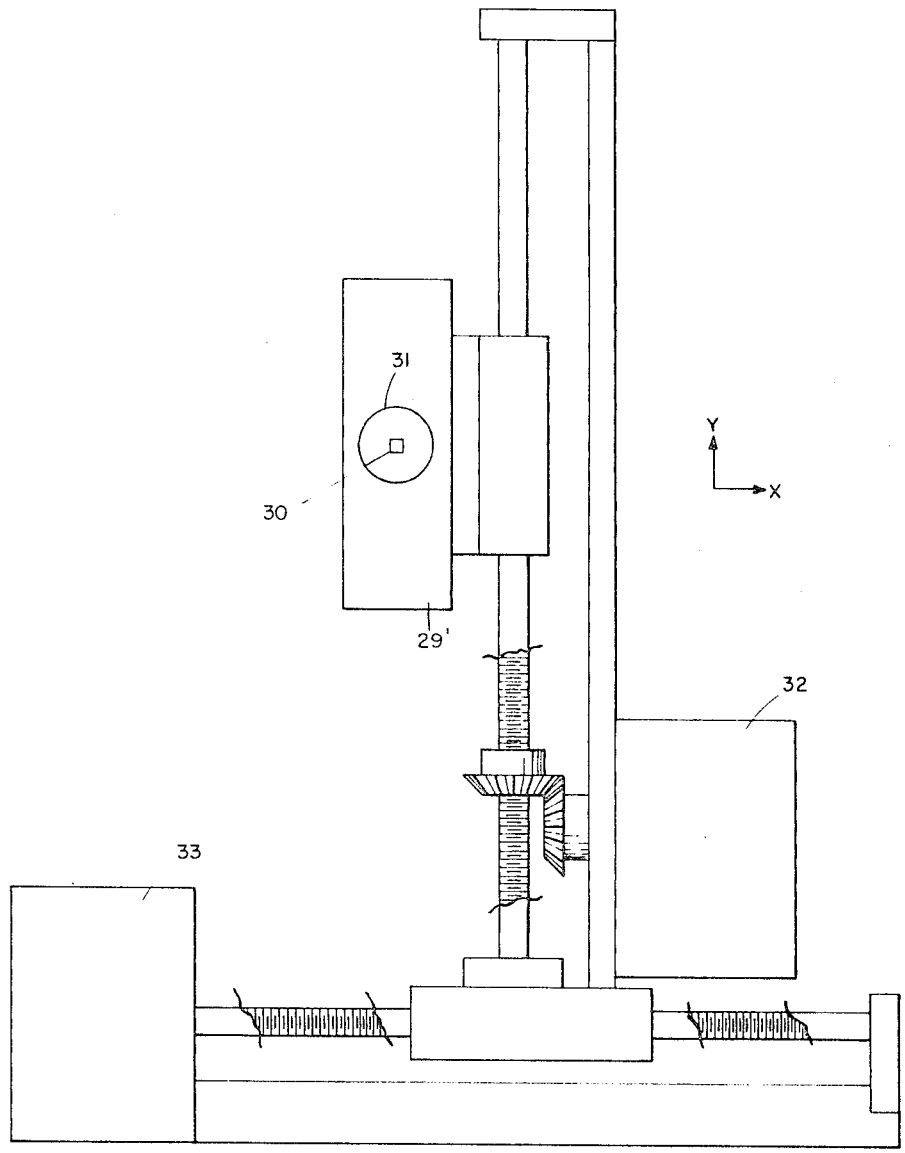

FIG. 6 is a schematic representation of a multicrystal spectrometer apparatus in which one bent crystal receives and reflects X-rays which are reflected from another bent crystal and pass through a small aperture thereby creating a highly monochromatic beam of X-rays incident on the second crystal; and FIG. 7 shows an X-ray detector and small aperture arrangement which can be scanned across the two-dimensional patterns.

Figure 1:
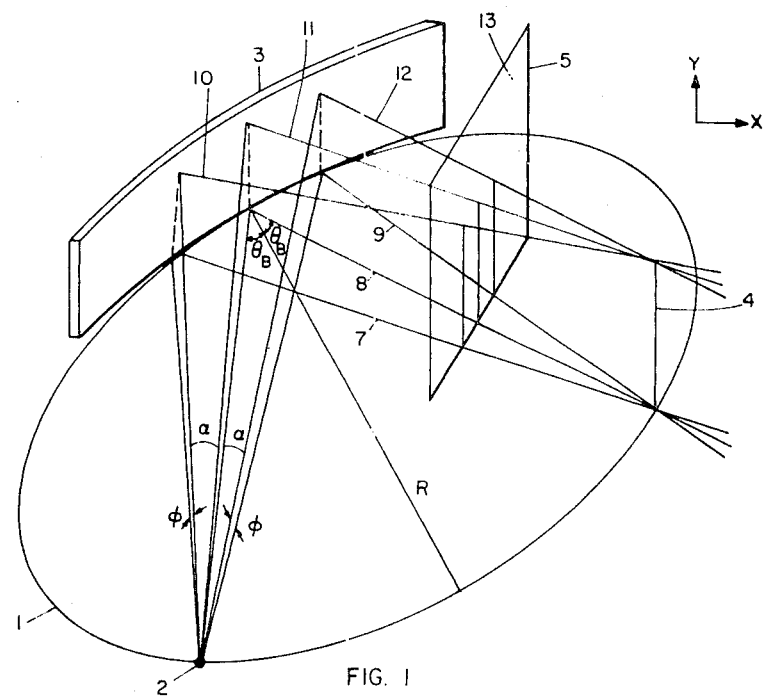
FIG. 1 is a schematic representation of spectrometer apparatus adapted to provide a two-dimensional pattern upon a film or other detector of reflected X-ray radiation.

Turning now to the drawings, a spectrometer is shown generally at 1 for displaying discrete spectral features of X-ray radiation. The apparatus is particularly useful in connection with radiation from a point source having a large cone angle, as is represented by the point source shown at 2. The X-rays are directed upon a fairly large curved crystal 3 (having a radius of curvature R) adapted to reflect and focus the rays at the crystal focal region shown at 4. A detector 5 positioned away from the focal region 4 receives the X-rays as a two-dimensional pattern of the type shown in FIG. 3. The detector may be a film, or a proportional counter placed behind a small aperture (as, for example, a several mil square opening) and adapted to scan across the pattern, or it may be the multichannel detector array shown at 6 in FIG. 5 comprising a plurality of multichannel multiplier imaging tubes 19, 20, 21, etc., the axes of which are oriented substantially parallel to the direction of propagation of the reflected X-rays. In FIG. 1, the reflected rays can be represented by the lines numbered 7–12, and the detecting surface 13 of the detector (the surface may be a film or the detecting surface of a multichannel array) is disposed substantially orthogonal to the direction of propagation of the rays; i.e. to the lines 7–12.

Figure 2:
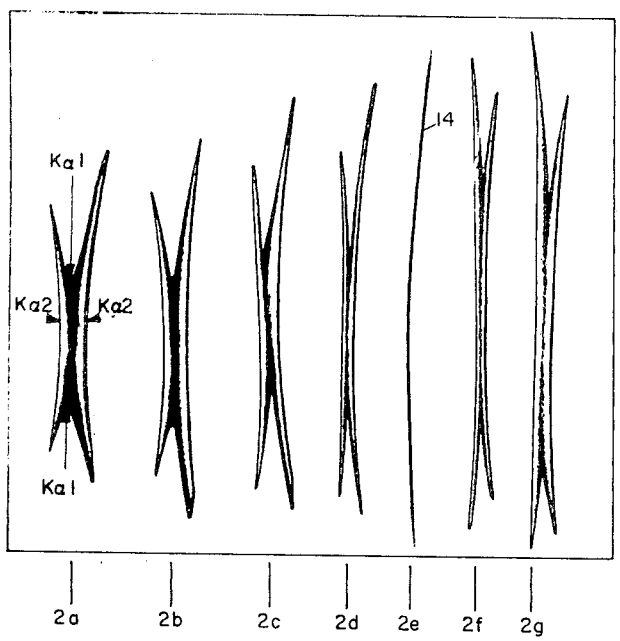
FIG. 2 shows the CrK$\alpha_1\alpha_2$ doublet reflection pattern from mica in fifth order in which the film was moved successive distances from the crystal to show the effects of focusing.
Figure 3:
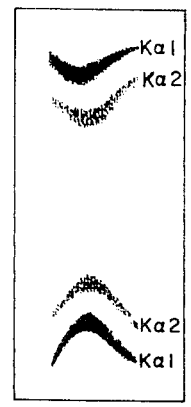
FIG. 3 is an X-ray picture of the CrK$\alpha_1\alpha_2$ doublet in eighth order.

The detector 5 in !FIG. 1 is located between the focal region 4 and the crystal 3 (as near to the crystal as practical) to provide a two-dimensional pattern of the type shown in FIG. 3. Prior devices wherein the detector is placed at the focal region provide a display in which all frequencies appear in a very narrow line pattern similar to the pattern numbered 14 in FIG. 2 making precise analysis difficult or impossible because the dispersion in the horizontal plane is very small and points in the vertical plane do not correspond to a single wavelength.

Figure 5:
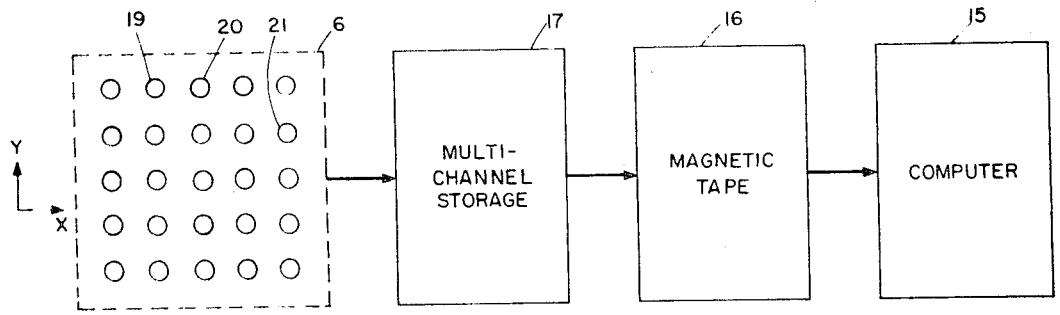
FIG. 5 is a block diagram showing, schematically, a multichannel detector the output of which is fed to a computer for analysis of the radiation presented to the spectrometer.

The positions of the tubes 19, 20, 21, etc. in the x–y plane of the array in FIG. 5, or of a small aperture which is scanned across the X-ray pattern, are known, which makes possible the identification of the various rays of the radiation in a manner now to be explained. Each ray is defined by a horizontal divergence $\alpha$ and a vertical divergence $\Phi$ in FIG. 1. Thus, the position that the ray strikes the detector surface is a means of identification thereof, and the tube that picks up a particular ray (since no other ray will strike that particular tube) identifies the ray upon proper analysis. Such analysis can be provided by a computer 15 programmed in the manner later discussed. The input to the computer is generally a magnetic tape 16 or other permanent storage device which in turn receives the data from a multichannel storage means 17. The data, of course, can be fed directly from the storage means 17 to the computer 15.

The crystal used as a dispersion device in this apparatus may either be cylindrically bent or spherically bent and must be fairly large (at least about one to three inches in cross dimensions). The computer is programmed to analyze the radiation in terms of wavelength on the basis of the following relationships:

$$n\lambda = 2d \sin(\theta_B + \Delta)$$

where $d$ is the crystal-lattice spacing, $\theta_B$ is the central Bragg angle, and $\Delta$ is given by $\Delta \approx \alpha^2/2 \cot \theta_B - \Phi^2/2 \tan \theta_B$ for a cylindrically bent crystal, and $\Delta \approx \alpha^2/2 \cot \theta_B$ for a spherically bent crystal.

The tubes will detect and count each reflected X-ray so that the computer will yield as output data the intensity of the X-rays as a function of their wavelength.

Figure 4:
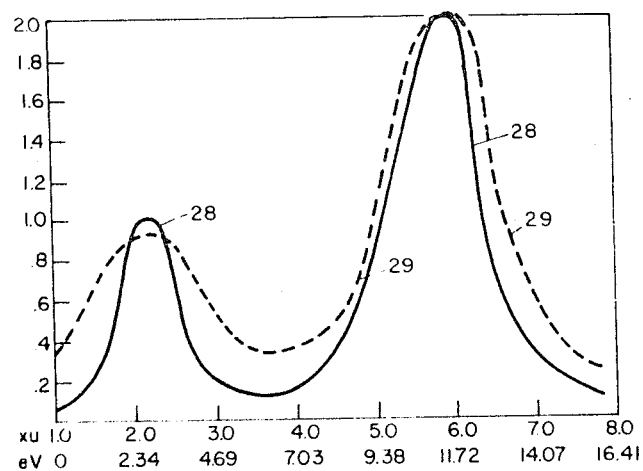
FIG. 4 is a graphic presentation typical of spectrum analysis charts that can be drawn using data furnished by the spectrometer herein described and also with conventional apparatus.

The patterns shown in FIGS. 2 and 3 are drawings of actual two-dimensional patterns made on X-ray film using the concept discussed herein. To obtain the patterns in FIG. 2 the film detector was moved successively greater distances from the crystal 3: 2a(3.75 inches), 2b(4.75 inches), 2c(5.75 inches), 2d(6.75 inches), 2e(7.75 inches, 2f(8.75 inches) and 2g(9.75 inches), the focal region for the particular crystal sued being 7.75 inches from the crystal. The pattern shown in FIG. 3 was made on an X-ray film located 4.75 inches from the same crystal. The data shown in FIG. 4 can be derived direct from the pattern in FIG. 3; however, the pattern can be scanned by a flying spot scanner and the output of the scanner can be fed to the computer 15, in the manner previously discussed, for analysis. In FIG. 4 the solid line designated 28 represents values obtained using the present invention and the broken line designated 29 represents values obtained using prior art devices.

This apparatus may also be used in a configuration in which the X-rays from a point source are reflected from a curved crystal and pass through a small aperture or vertical slit which is used as a source of X-rays for the apparatus previously discussed. This configuration is shown in FIG. 6. The first crystal and small aperture are used to create a beam of X-rays of essentially a single wavelength which is then analyzed by this apparatus. The two crystal reflections give a higher resolution (≈ a factor of two better) than a single reflection. In the apparatus shown in FIG. 6, a member 22 (as a lead sheet) opaque to X-rays and containing a small aperture 23 (the order of several mils square) is interposed between the crystal 3 and the detector to pass a narrow band only of the rays therethrough. The rays, as represented by the line numbered 24, that pass through the aperture 23 are received at the convex surface of a second or further crystal 25 and reflected to a small apertured proportional counter 5'. Alternatively, the narrow band of rays reflected by the first crystal pass through the aperture 23 to the concave surface of the crystal shown at 26 and thence to a further small apertured proportional counter 5''. As can be appreciated, one or the other, but not both, arrangement is used in any particular apparatus. The narrow band of rays are reflected by the concave surface of the first crystal 3, by the convex surface of the further crystal 25 (located between the crystal 3 and the focal region 4), or by the concave surface of the crystal 26 (located beyond the focal region of the crystal 3).

In FIG. 7 the detector numbered 29' is positioned behind a small aperture 30 (several mils square, preferably) in an opaque shield 31 and the detector and shield are moved as a unit in the x-y plane by a pair of motors 32 and 33 which drive the unit through the gearing shown to raster scan across the two-dimensional X-ray pattern reflected by the crystal 3. The detector can be positioned inside the focal region in the same fashion as the detector 5 in FIG. 1 or beyond the focal region 4, as mentioned. The output of the detector 29' can be fed to a computer programmed to provide spectral information, as before discussed.

The source 2 can be a point source of X-rays from a substance bombarded by high energy electrons, for example, or it can be X-rays produced by the interaction of other X-rays incident upon a material (fluorescent X-rays), or it can be the focus of an X-ray concentrator used to observe cosmic X-rays.

Further modifications of the invention will occur to persons skilled in the art and all such modifications are intended to fall within the spirit and scope of the invention as defined in the appended claims.

What is claimed is:

1. An X-ray spectrometer for displaying discrete spectral features, that comprises, a point source of X-rays that illuminates a large solid angle, a curved crystal positioned to receive the X-rays from said point source and adapted to reflect and focus the same, and two-dimensional detector means positioned away from the focal region of the crystal to receive the X-rays as a two-dimensional spectrally dispersed pattern.

2. Apparatus as claimed in claim 1 in which the detector is a film oriented substantially orthogonal to the direction of propagation of the X-rays to receive and record the same.

3. Apparatus as claimed in claim 1 in which an X-ray detector is placed behind a small aperture and in which means is provided to raster scan across the two-dimensional pattern.

4. Apparatus as claimed in claim 1 in which the point source of X-rays has a large cone angle.

5. Apparatus as claimed in claim 4 in which the detector comprises a multichannel detector array the detecting surface of which is disposed substantially orthogonal to the direction of propagation of the X-rays.

6. Apparatus as claimed in claim 5 in which the multichannel detector array comprises a plurality of multichannel multiplier imaging tubes the axes of which are oriented substantially parallel to the direction of propagation of the reflected X-rays.

7. Apparatus as claimed in claim 6 including multichannel storage means to receive signals from the tubes of the array individually and to record the intensity of the X-ray radiation received by each of the tubes, the signals from the tubes being accumulated by said multichannel storage means.

8. Apparatus as claimed in claim 7 and including permanent storage means to receive and store an output from the multichannel storage means.

9. Apparatus as claimed in claim 8 and including a computer to receive and analyze the information accumulated in the storage means.

10. Apparatus as claimed in claim 1 in which the detector comprises a multichannel detector array and in which the output of the detector array is fed to a computer programmed to analyze the radiation in terms of wavelengths on the basis of the following relationships:

$$n\lambda = 2d \sin(\theta_B + \Delta)$$

where $d$ is the crystal-lattice spacing, $\theta_B$ is the central Bragg angle, and $\Delta$ is given by $\Delta \approx \alpha^2/2 \cot \theta_B - \Phi^2/2 \tan \theta_B$ for a cylindrically bent crystal, and $\Delta \approx \alpha^2/2 \cot \theta_B$ for a spherically bent crystal.

11. Apparatus as claimed in claim 1 in which the crystal is a substantially large crystal at least about 1 to 3 inches in cross dimensions.

12. A method of displaying discrete spectral features of X-ray radiation, that comprises, directing the radiation from a large cone angle point source upon a curved crystal adapted to reflect and focus the radiation, and detecting the radiation at an area positioned away from the focal region thereof as a widely dispersed two-dimensional pattern.

13. An X-ray spectrometer for displaying discrete spectral features of radiation from a point X-ray source which illuminates a large solid angle, that comprises, a fairly large cylindrically bent or spherically bent crystal, at least about 1 to 3 inches in cross dimensions, adapted to reflect and focus the spectral band of rays from said source at the crystal focal region, and two-dimensional detector means positioned away from the focal region of the crystal and having a detector oriented to receive the spectral band of X-rays and to display the X-rays as a two-dimensional spectrally dispersed pattern from which a high-resolution spectrum can be obtained.

14. A Method of displaying spectral features of X-ray radiation from which a high-resolution spectrum can be obtained, that comprises, directing a large cone angle of X-ray radiation upon a substantially large bent crystal adapted to reflect and focus the radiation, reflecting and focusing the radiation toward the focal region of the crystal, and simultaneously detecting all the reflected radiation at an area positioned away from the focal region as a widely dispersed, two-dimensional pattern.

* * * * *